United States Patent
Drasin

(10) Patent No.: US 10,693,972 B2
(45) Date of Patent: Jun. 23, 2020

(54) SECURE CROSS-DOMAIN SESSION STORAGE

(71) Applicant: salesforce.com, inc., San Francisco, CA (US)

(72) Inventor: Ben Drasin, Portland, OR (US)

(73) Assignee: salesforce.com, inc., San Francisco, CA (US)

(*) Notice: Subject to any disclaimer, the term of this patent is extended or adjusted under 35 U.S.C. 154(b) by 148 days.

(21) Appl. No.: 15/686,769

(22) Filed: Aug. 25, 2017

(65) Prior Publication Data

US 2019/0068723 A1 Feb. 28, 2019

(51) Int. Cl.
*H04L 29/06* (2006.01)
*H04L 29/08* (2006.01)
*H04L 12/58* (2006.01)
*G06F 16/958* (2019.01)

(52) U.S. Cl.
CPC .......... *H04L 67/147* (2013.01); *G06F 16/958* (2019.01); *H04L 51/18* (2013.01); *H04L 67/02* (2013.01); *H04L 67/10* (2013.01); *H04L 67/141* (2013.01)

(58) Field of Classification Search
CPC ........ H04L 67/147; H04L 51/18; H04L 67/10
USPC ....................................................... 709/204
See application file for complete search history.

(56) References Cited

U.S. PATENT DOCUMENTS

| | | | | |
|---|---|---|---|---|
| 7,984,170 B1* | 7/2011 | Shalla | ..................... | G06F 9/546 709/217 |
| 8,108,882 B1* | 1/2012 | Haynes, Jr. | ........... | G06F 13/102 709/230 |
| 2008/0126785 A1* | 5/2008 | Chong | .................. | G06F 9/4401 713/2 |
| 2009/0132713 A1* | 5/2009 | Dutta | .................... | G06F 16/958 709/227 |
| 2011/0311136 A1* | 12/2011 | Schechter | ............... | G06F 9/468 382/173 |
| 2015/0350253 A1* | 12/2015 | Alderson | ................ | H04L 63/20 726/1 |
| 2018/0115597 A1* | 4/2018 | Gillette | ................. | G06F 16/178 |

* cited by examiner

*Primary Examiner* — Adnan M Mirza
(74) *Attorney, Agent, or Firm* — Holland & Hart LLP

(57) ABSTRACT

Methods, systems, and devices for webpage domain handling are described. Some systems may include functionality for a user device to persist embedded application sessions between different webpages. For example, the user device may load a first webpage for a first domain, instantiate an inline frame (iframe) within the webpage, and run an embedded application in the webpage. Using an iframe-embedded document for a host server, the user device may store session data associated with running the application in session storage for the host server. If the user device switches to a second webpage (e.g., of a different domain) while continuing to run the application, the user device may reload the iframe and enclosed document, and may retrieve the active session data from the session storage for the host server. The user device may continue running the embedded application without interruption in the second webpage based on this session data.

20 Claims, 11 Drawing Sheets

SECURE CROSS-DOMAIN SESSION STORAGE

FIELD OF TECHNOLOGY

The present disclosure relates generally to database systems and data processing, and more specifically to secure cross-domain session storage.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some systems, a user device may run an application in a webpage (e.g., as an embedded component). The application may include session information related to the current running of the application in the webpage. In some cases, the user device may switch to a different webpage while continuing to run the application. However, if the different webpage is from a different domain, the different webpage may not have access to the session information for the application, resulting in an interruption of the application service.

DETAILED DESCRIPTION

In some systems, a user device may implement code and webpage components to support secure cross-domain session storage. The user device may run an application in a first webpage, for example, as a component embedded in the first webpage. The application may be an example of a chat session, a webpage or web browser plug-in, a widget, or any combination of these or other webpage-embedded applications. In order to store session data associated with the application in resources accessible across multiple domains, the user device may instantiate an inline frame (iframe) in the webpage, and the iframe may load a document associated with a host server. In some cases, the system may be configured such that the host server is specifically designed to efficiently provide a static document (e.g., a webpage containing programmable code, such as JavaScript) to multiple user devices.

The user device may implement cross-domain inter-frame communications between the webpage and the iframe. For example, the webpage may be associated with a first domain, and the iframe may be associated with a second domain (e.g., the domain of the host server). To support communications between the two domains, the user device may implement postMessage and onMessage application programming interfaces (APIs). Using these cross-domain communications, the user device may store or retrieve session data in session storage for the host server. If the user device performs a webpage switch (e.g., from the first webpage to a second webpage associated with a different domain), the user device may store session data associated with the application on page unload. The user device may load the second webpage, and instantiate another iframe containing the host document from the host server. Based on the iframe-enclosed documents corresponding to a same host domain, the iframe-enclosed document may provide session data access to any container webpage. The iframe-enclosed document may check the domain of the second webpage, and may select session data in the host domain session storage that corresponds to this domain. The user device may then continue running the application in the second webpage by using the retrieved session data. In this way, embedded applications, such as chat windows or widgets, may continue running and limit interruptions during a webpage domain switch.

Aspects of the disclosure are initially described in the context of an environment supporting an on-demand database service. Further aspects are discussed with respect to a timeline and process flows illustrating reading and writing data to storage persisted between domains. Aspects of the disclosure are further illustrated by and described with reference to apparatus diagrams, system diagrams, and flowcharts that relate to secure cross-domain session storage.

Figure 1:
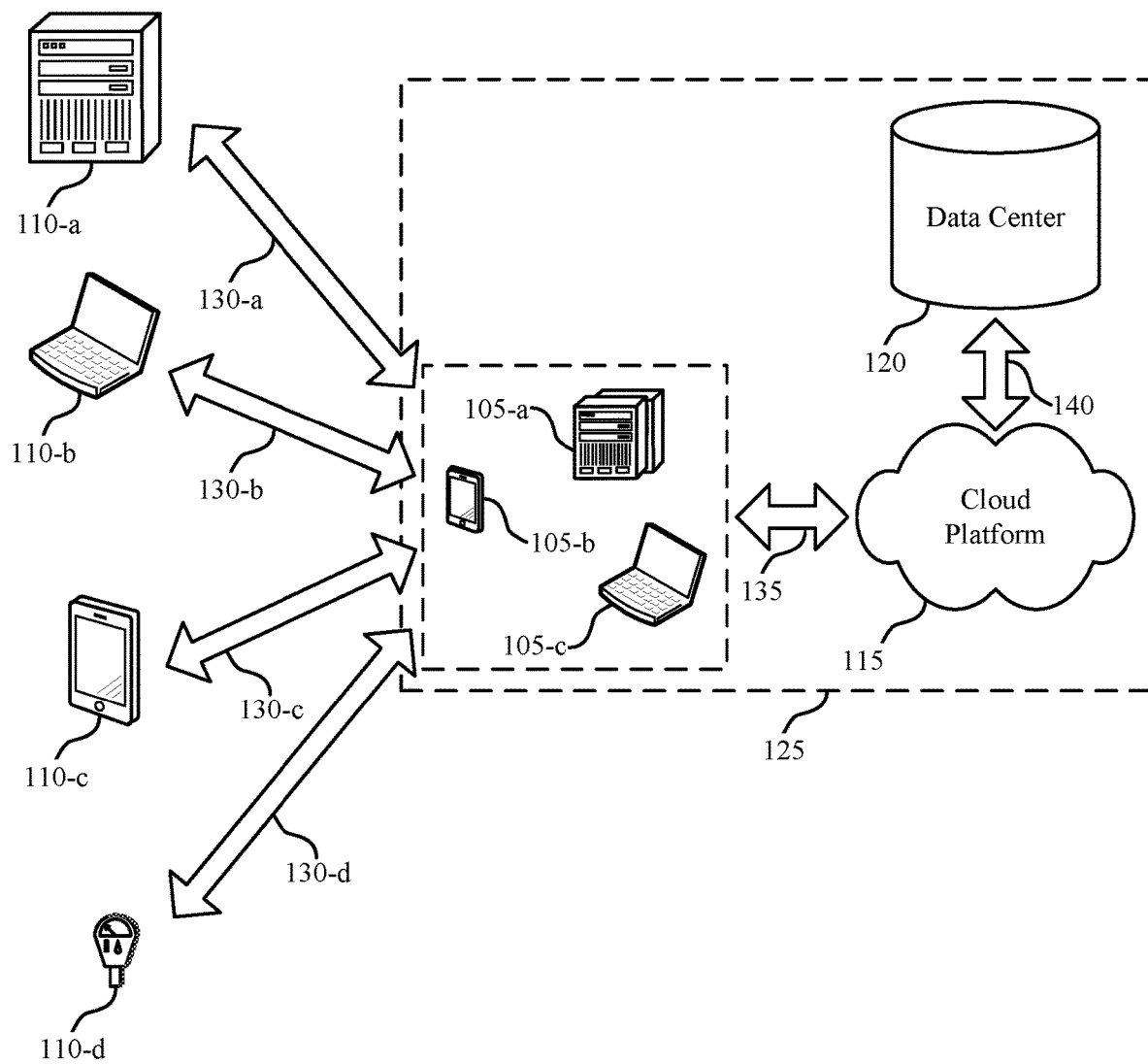
FIG. 1 illustrates an example of a system for webpage domain handling that supports secure cross-domain session storage in accordance with aspects of the present disclosure.

FIG. 1 illustrates an example of a system 100 for cloud computing that supports secure cross-domain session storage in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

A cloud client 105 or contact 110 may be an example of a user device. The cloud client 105 or contact 110 may implement code and webpage components to support secure cross-domain session storage. For example, the user device may run an application embedded in or associated with a first webpage. The user device may instantiate an iframe in the webpage in order to store a document associated with a domain of a host server. For example, the host server may be a component of data center 120. In some cases, the system 100 may be configured such that the host server is specifically designed to efficiently provide a static document (e.g., a webpage containing programmable code, such as JavaScript) to multiple user devices. The static document associated with the host domain may provide access to session storage for the host domain.

The user device may implement cross-domain inter-frame communications between the webpage and the iframe. For example, the webpage may be associated with a first domain, and the iframe may be associated with the host domain. To support communications between the two domains, the user device may implement postMessage and onMessage APIs. Using these cross-domain communications, the user device may store or retrieve session data in session storage for the host server. If the user device performs a webpage switch (e.g., from the first webpage to a second webpage associated with a second domain), the user device may store session data associated with the application on page unload. The user device may load the second webpage, and instantiate another iframe containing a static document (e.g., the same static document) from the host server. Based on the iframe-enclosed documents corresponding to the same host domain, the container webpages may access the same host session storage, despite corresponding to different webpage domains. In some cases, for enhanced security, the iframe-enclosed document may check the domain of the second webpage, and may determine which session data in the host session storage corresponds to the second webpage. The user device may then continue running the application in the second webpage by retrieving the corresponding session data. In this way, embedded applications, such as chat windows, plug-ins, widgets, etc., may continue running with limited interruptions during a webpage domain switch.

Figure 2:
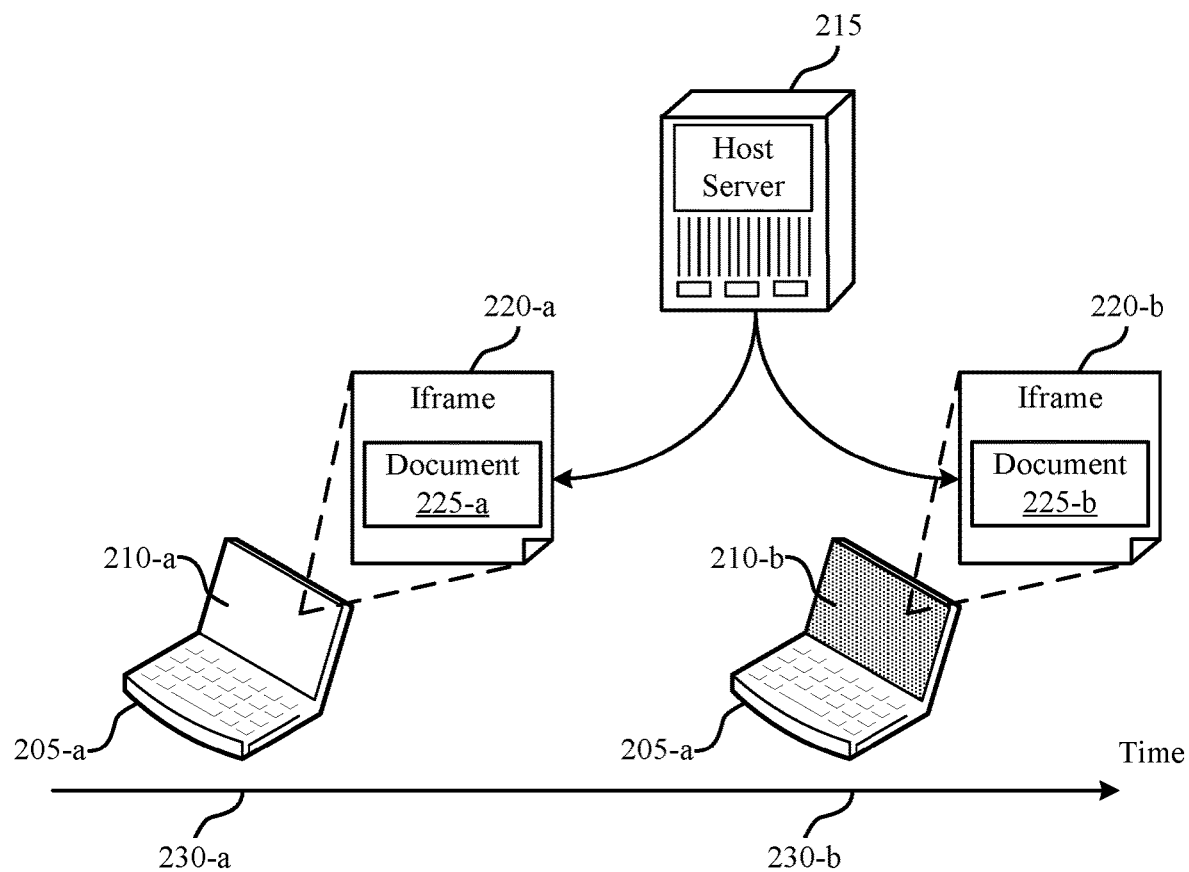
FIG. 2 illustrates an example of a timeline for domain switching that supports secure cross-domain session storage in accordance with aspects of the present disclosure.

FIG. 2 illustrates an example of a timeline 200 for domain switching that supports secure cross-domain session storage in accordance with various aspects of the present disclosure. The timeline 200 may illustrate a user device 205-a switching from a first webpage 210-a at time 230-a to a second webpage 210-b at time 230-b. User device 205-a may be an example of a cloud client 105 or contact 110 as described with reference to FIG. 1. In some cases, first webpage 210-a and second webpage 210-b may correspond to different hierarchical address spaces (e.g., a first domain and a second domain, respectively). User device 205-a may run an application that persists from the first domain to the second domain. However, session storage data for the first domain may not persist to the second domain. Accordingly, user device 205-a may implement a client-side storage mechanism to support persisting storage data between domains for applications or snap-ins.

At first time 230-a, user device 205-a may run an application in first webpage 210-a. The application may be an example of a stateful web application. For example, the application may be a live chat session, an appointment scheduler, or some similar application. At second time 230-b, user device 205-a may switch to second webpage 210-b. However, the application may continue running on user device 205-*a* uninterrupted following the webpage switch. For example, during the webpage switch, user device 205-*a* may serialize data associated with the application on page unload (e.g., for webpage 210-*a*), and may store the serialized data. Correspondingly, on page load (e.g., for webpage 210-*b*), user device 205-*a* may search session storage for data associated with a running application. Session storage may be local data storage for user device 205-*a*, and in some cases may include logic for removing session data upon closing of a web browser. If user device 205-*a* identifies data or information to load in webpage 210-*b*, user device 205-*a* may de-serialize the session data in session storage, and may use the de-serialized data to continue running the existing application in webpage 210-*b*.

In some cases, if webpage 210-*a* and webpage 210-*b* exist in a same domain, webpage 210-*a* may store serialized application information in session storage associated with that domain, and webpage 210-*b* may retrieve the application information from session storage in the same domain. However, in other cases, webpage 210-*a* and webpage 210-*b* may exist in different domains. In these cases, webpage 210-*a* and webpage 210-*b* may exist in related or unrelated domains. If the webpages 210 exist in unrelated domains, user device 205-*a* may not continue running an existing application in webpage 210-*b* following the switch (e.g., for security reasons). Alternatively, if webpage 210-*a* and webpage 210-*b* exist in different but related domains, user device 205-*a* may reload the application in webpage 210-*b* using cross-domain session storage. In one example, both domains may correspond to a same top-level or root domain.

If webpage 210-*a* and webpage 210-*b* exist in different but related domains, user device 205-*a* may implement an iframe 220 enclosed document 225 to store application information in session storage available to webpages 210 of different domains. For example, user device 205-*a* may create iframe 220-*a* in webpage 210-*a*. For example, a script or executable code in webpage 210-*a* may create iframe 220-*a*, and may include an indication of a domain for webpage 210-*a*, which may be stored in internal memory for iframe 220-*a*. Iframe 220-*a* may load document 225-*a* from a host server 215. Upon loading, document 225-*a* may inspect iframe 220-*a* to determine the domain for the container webpage 210-*a*. In some cases, document 225-*a* may be an example of a static document containing JavaScript or some other programmable code that supports functionality for storing data in or retrieving data from session storage. In this way, by using document 225-*a* from the host server 215, user device 205-*a* may implement session storage for the domain of the host server 215, and not necessarily from the domain for either webpage 210-*a* or 210-*b*. For example, the host server 215 may correspond to a same domain as webpage 210-*a*, webpage 210-*b*, both webpages 210, or neither webpage 210. Similarly, the host server 215 may or may not correspond to a same domain as a top-level or root domain for webpages 210-*a* or 210-*b*. Based on using iframe 220-*a*, any data stored in session storage at user device 205-*a* may be identified and handled by a web browser of user device 205-*a* as if the data is hosted by the host server 215 and corresponds to the host domain.

At time 230-*b*, user device 205-*a* may perform a webpage 210 switch from webpage 210-*a* to webpage 210-*b*. For example, the webpage 210 switch may be based on a user input to user device 205-*a* (e.g., a user may select a link in webpage 210-*a* that takes the web browser from webpage 210-*a* to webpage 210-*b*). If user device 205-*a* is running an application at the time of the webpage 210 switch, user device 205-*a* may store information related to the application in session storage 225. For example, for a live chat session application, user device 205-*a* may store a chat transcript, a chat state, a widget state, widget banner text, unread notifications, or any combination of this information. Webpage 210-*a* may perform cross-domain messaging—such as using a postMessage communication—to send the information (e.g., as serialized data for data storage) to the iframe 220-*a* embedded document. For example, the postMessage communication may include an indication of a data structure and one or more domains, where container webpages associated with the indicated one or more domains may access the session information in session storage. The iframe 220-*a* embedded document 225-*a* may write the information to session storage, including an indication of the one or more domains granted access to the information. These one or more domains may include a domain corresponding to webpage 210-*a* (e.g., a top-level domain or a domain for webpage 210-*a*).

Upon loading webpage 210-*b*, user device 205-*a* may search for previously existing application data in session storage. For example, webpage 210-*b* may instantiate iframe 220-*b* with document 225-*b*, which, like iframe 220-*a* and document 225-*a*, may be hosted by the host server 215 and provide access to session storage. For example, because the session data for the application was stored in session storage for the host domain, webpage 210-*b* may access the same session storage for the host domain using iframe 220-*b* and embedded document 225-*b*. User device 205-*a* or one of its components may identify the existing application data in session storage, and may determine a storage domain or a set of storage domains associated with the application data. A storage domain may be an example of a top-level domain, or may be a sub-domain (e.g., a domain nested within a top-level domain). If the domain for webpage 210-*b* matches or is a sub-domain of one of the indicated storage domains, user device 205-*a* may determine to retrieve the application data and continue running the existing application in webpage 210-*b*. In some cases with different security standards, user device 205-*a* may not check whether the container domain indicated in iframe 220-*b* is associated with a storage domain in the session storage. The cross-domain messaging described above may occur synchronously or asynchronously at user device 205-*a*.

If the host domain is different than the webpage domains, the host server 215 may support session storage for multiple different storage domains. For example, the host server 215 may store session storage for a first top-level domain (e.g., corresponding to a first tenant) and associated sub-domains, along with session storage for a second top-level domain (e.g., corresponding to a second tenant) and associated sub-domains. The host server 215 may store data related to each top-level domain with an indication of the associated top-level domain (e.g., the storage domain). Based on these indications, the host server 215 may implement security protocols to limit access to the session storage data. For example, a webpage 210 corresponding to the second top-level domain may not be granted access to session data for the first top-level domain. Additionally, indicating the storage domain in cross-domain communications, such as postMessage functions, may prevent malicious interceptions of the session information. For example, if a postMessage call is intercepted or if session storage data is retrieved by a malicious webpage 210, the webpage 210 not associated with any of the indicated storage domains may not be able to access or determine the session information in the postMessage or session storage. With such security protocols, the host server 215 may provide session storage for multiple domains without compromising session data security. Due to the session data keys, a malicious webpage may not be able to get or set any session data for a domain other than its own.

Figure 3:
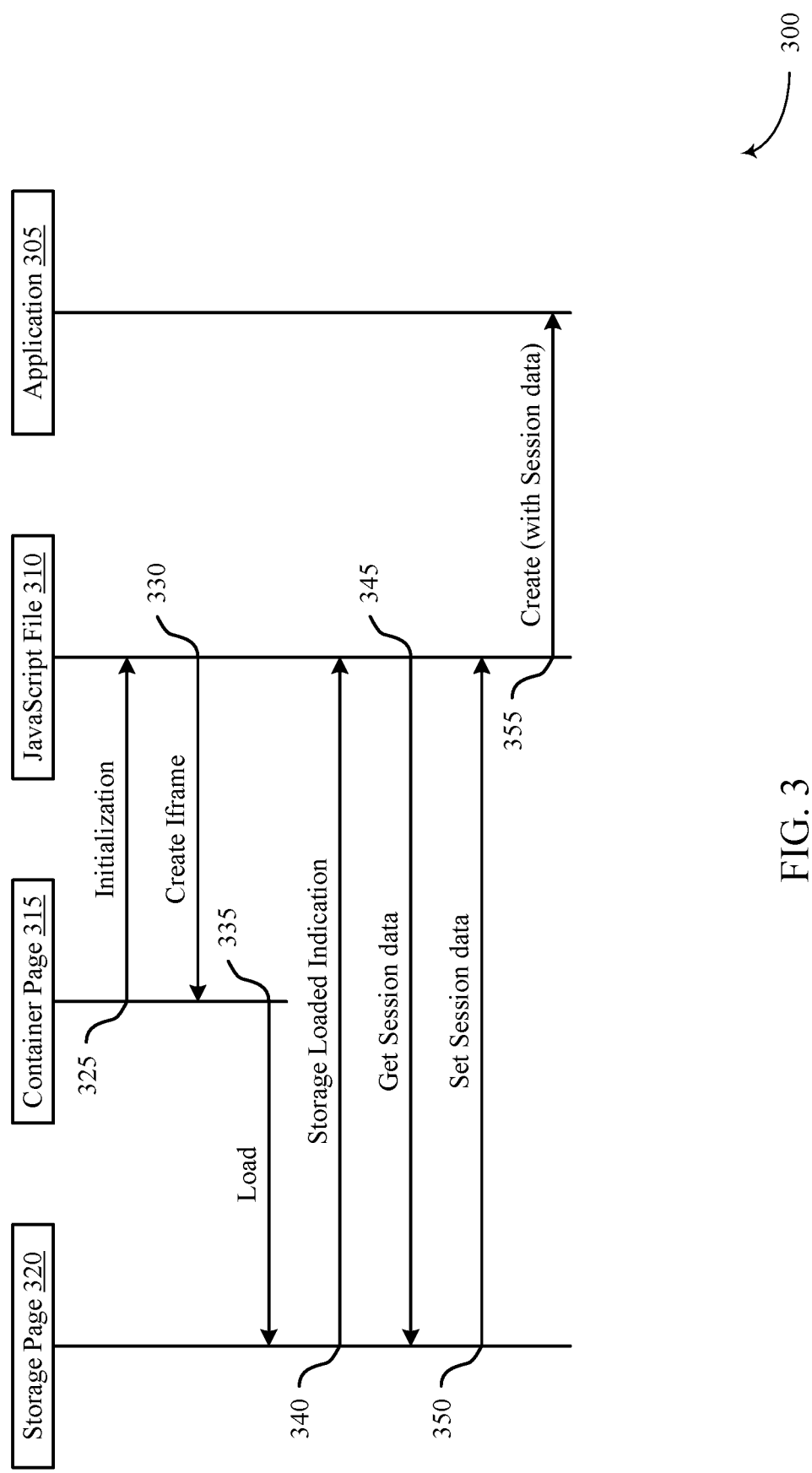
FIG. 3 illustrates an example of a process flow for reading data from persisted storage that supports secure cross-domain session storage in accordance with aspects of the present disclosure.

FIG. 3 illustrates an example of a process flow 300 for reading data from persisted storage that supports secure cross-domain session storage in accordance with various aspects of the present disclosure. The process flow 300 may include an application 305 that may run on a user device, which may be an example of a cloud client 105, contact 110, or user device 205 as described with reference to FIGS. 1 and 2. The process flow 300 may additionally include a JavaScript file 310—or some similar programmable file—a container page 315, a storage page 320, or some combination of these. The process flow 300 may illustrate one possible implementation for reading data from persisted storage (e.g., session storage) to display the data or an indication of the data in the application 305.

At 325, the container page 315 may initialize the JavaScript file 310. The container page 315 may be an example of a webpage, such as a webpage 210 as described with reference to FIG. 2. The container page 315 may be associated with a certain domain, which may be referred to as a container domain. In some cases, the JavaScript file 310 may be an example of programmable code utilizing a different programming language (e.g., a language other than JavaScript). The initialization at 325 may occur upon loading the container page 315 for the application 305 at a user device.

At 330, the JavaScript File 310 may create an iframe in the container page 315. The iframe may contain data or documents hosted on a different server than the container page 315. In this way, an iframe-enclosed document may access data stored for a different server than the one associated with the container page 315.

At 335, the container page 315, or the iframe, may load a storage page 320 into the iframe. In some cases, the container page 315 or iframe may load the storage page 320 from a global load balancer. The storage page 320 may be an example of a hypertext markup language (HTML) file. A request to load the storage page 320 may include a query parameter indicating the container domain of the container page 315, so that the storage page 320 may identify the container domain (e.g., in some cases, the storage page 320 may not have access to information in the container page 315). Additionally or alternatively, the storage page 320 may contain functions (e.g., in code) to store, retrieve, or delete persisted data (e.g., session storage data). As the storage page 320 is enclosed within the iframe, the storage page 320 may be loaded from a different domain (e.g., a host domain, associated with a host server for the storage page 320) than the container domain for the container page 315. The storage page 320 may access data from session storage for this different domain, and provide services to allow the container page 315 and the application 305 to access this data based on the storage page 320. Depending on security protocols of the user device or host server, this data in session storage may be associated with one or more storage domains. In some cases, a storage domain may be an example of a top-level domain or a root domain associated with a tenant. A security protocol may determine whether the container domain is a sub-domain of the top-level domain (e.g., including the top-level domain itself), and may not load the storage page 320 if the container domain is not a sub-domain of the top-level domain. At 340, the storage page 320 may send an indication to the JavaScript file 310 that the storage page 320, and a corresponding link or connection to the stored session data, was loaded correctly.

At 345, the JavaScript file 310 may send a message to get storage data (e.g., session storage data) to the storage page 320. The storage page 320, the JavaScript file 310, the security protocol, or some other component of the user device may check whether an origin of the message matches the container domain indicated in the query parameter sent upon loading the storage page 320. Additionally or alternatively, one of these components may check whether the origin of the message is equal to, or a sub-domain of, the storage domain. If the origin corresponds to the storage domain, the storage page 320 may retrieve the requested data from a set of data in session storage. For example, the user device may store data associated with the storage domain in session storage. Any storage page 320 associated with that same storage domain may retrieve storage data from the set of data associated with that storage domain. The association of the storage data with the storage domain may be based on a key. For example, each data object may be stored in session storage with a key containing an indication of the storage domain, a key for the data object, or some combination or concatenation of these—or other similar—keys.

At 350, the storage page 320 may set storage data at the JavaScript file 310. For example, the storage page 320 may retrieve data associated with the storage domain from session storage, and may return the data to the container page 315 (e.g., through the JavaScript file 310). This data may be retrieved from session storage at the client-side user device. In some cases, at 355, the JavaScript file 310 may create or modify the application 305 using the retrieved storage data. For example, the application 305 may be an example of a real-time or pseudo-real-time application, such as a live chat session, an appointment scheduler, or some similar application. In some cases, the process illustrated by the process flow 300 may occur upon loading of the container page 315. In other cases, the process may occur based on an update or modification of the storage data, or based on running or re-running the application 305.

Figure 4:
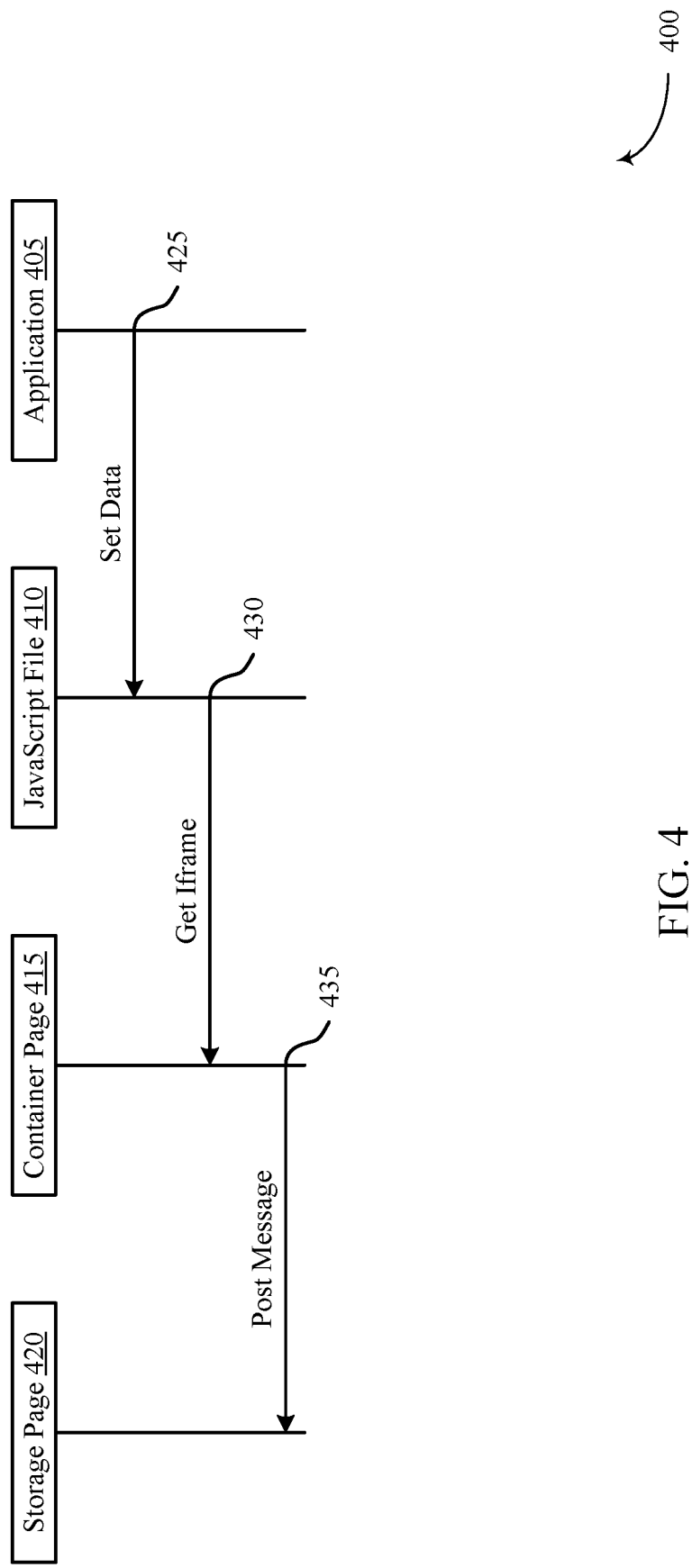
FIG. 4 illustrates an example of a process flow for writing data to persisted storage that supports secure cross-domain session storage in accordance with aspects of the present disclosure.

FIG. 4 illustrates an example of a process flow 400 for writing data to persisted storage that supports secure cross-domain session storage in accordance with various aspects of the present disclosure. The process flow 400 may include an application 405 that may run on a user device, which may be an example of a cloud client 105, contact 110, or user device 205 as described with reference to FIGS. 1 and 2. The process flow 400 may additionally include a JavaScript file 410—or some similar programmable file—a container page 415, a storage page 420, or some combination of these. The application 405, JavaScript file 410, container page 415, and storage page 420 may be examples of the corresponding devices or components described with respect to FIG. 3. The process flow 400 may illustrate one possible implementation for writing data to persisted storage (e.g., session storage) to save for reuse across domains in an application 405.

At 425, an application 405 may indicate data to a JavaScript file 410 to be stored in persistent storage (e.g., session storage). In some cases, the application 405 may be an example of a real-time or pseudo-real-time application, such as a live chat session or some similar application. The application 405 may indicate the data in a "setData" function, which may indicate the data, a data structure, a key associated with the data, or some combination of these parameters.

At 430, the JavaScript file 410 may get the iframe. In some cases, the JavaScript file 410 may implement code to allow the container page 415 to interact with the storage page 420 using the iframe. At 435, the container page 415 may send the data to the storage page 420 to be stored in session storage. If the container page 415 and the storage page 420 are associated with different domains (e.g., a container domain and a host domain), the container page 415 may implement cross-window or cross-domain messaging. For example, the container page 415 may send the data to the storage page 420 using a postMessage function, where the postMessage function may indicate the data (e.g., in a specified data structure), the data key, the storage domain, the origin (e.g., the container domain), or some combination of these parameters. The storage page 420 may handle the postMessage function (e.g., using an onMessage function), and may store the data in session storage based on the postMessage function. In some cases, the storage page 420 may store the data with an indication of the data key, the storage domain, or some combination of these parameters. For example, the storage page 420 may store the data in session storage using a concatenated key of the storage domain and the data key. Based on this stored data, if the user device switches to a different container page 415 while running the application 405, the new container page 415 and application 405 may retrieve the data from session storage based on the storage page 420 embedded in the iframe, even if the two container pages 415 are associated with different domains (e.g., if one is a sub-domain of the other).

The above processes may occur based on loading a webpage, running or re-running the application 405, or some sort of query from the application 405 to session storage. In some cases, the described components may also support delete requests, where the application 405 or container page 415 may send a request to delete session information from session storage to the storage page 420 (e.g., via the JavaScript file 410). Based on the above described security protocol, the storage page 420 may determine whether to delete the specified session data from sessions storage.

Figure 5:
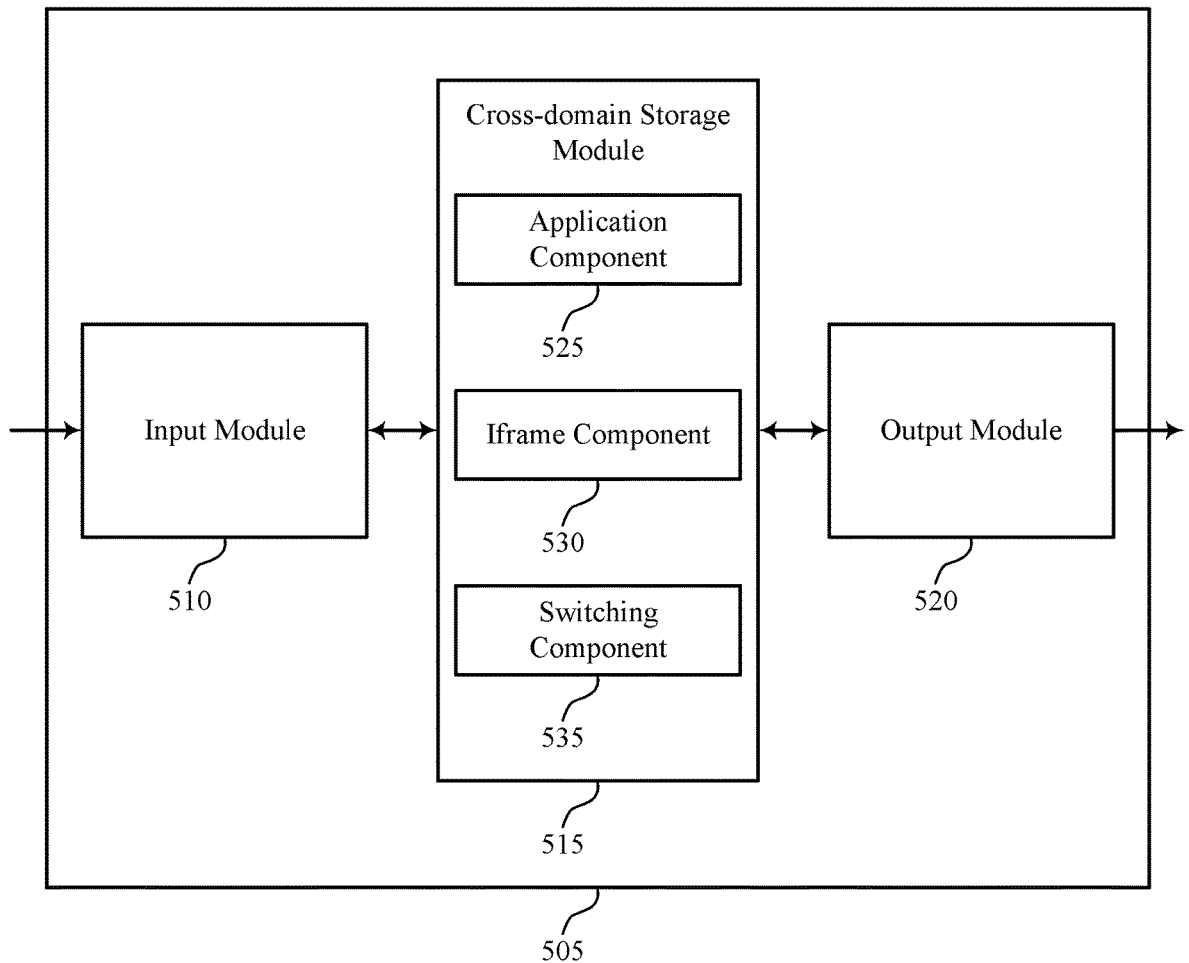
FIGS. 5 through 6 show block diagrams of a device that supports secure cross-domain session storage in accordance with aspects of the present disclosure.

FIG. 5 shows a block diagram 500 of an apparatus 505 that supports secure cross-domain session storage in accordance with aspects of the present disclosure. Apparatus 505 may include input module 510, cross-domain storage module 515, and output module 520. Apparatus 505 may also include a processor. Each of these components may be in communication with one another (e.g., via one or more buses). In some cases, apparatus 505 may be an example of a user terminal, a database server, or a system containing multiple computing devices.

Cross-domain storage module 515 may be an example of aspects of the cross-domain storage module 715 described with reference to FIG. 7. Cross-domain storage module 515 may also include application component 525, iframe component 530, and switching component 535.

Cross-domain storage module 515 and/or at least some of its various sub-components may be implemented in hardware, software executed by a processor, firmware, or any combination thereof. If implemented in software executed by a processor, the functions of the cross-domain storage module 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The cross-domain storage module 515 and/or at least some of its various sub-components may be physically located at various positions, including being distributed such that portions of functions are implemented at different physical locations by one or more physical devices. In some examples, cross-domain storage module 515 and/or at least some of its various sub-components may be a separate and distinct component in accordance with various aspects of the present disclosure. In other examples, cross-domain storage module 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Application component 525 may receive, at a host server, a request to load a cross-domain application on a first container webpage, the first container webpage corresponding to a first web domain.

Iframe component 530 may load, in the first container webpage, an inline frame (iframe) enclosed document corresponding to the cross-domain application, where the iframe enclosed document is hosted by the host server and associated with a host web domain different than the first web domain. Iframe component 530 may additionally reload, in a second container webpage, the iframe enclosed document based on the host web domain, where the iframe enclosed document is hosted by the host server and associated with the host web domain. In some cases, the iframe enclosed document includes a live web chat session.

Switching component 535 may receive an indication of a webpage switch to the second container webpage corresponding to a second web domain different than the first web domain and the host web domain.

Figure 6:
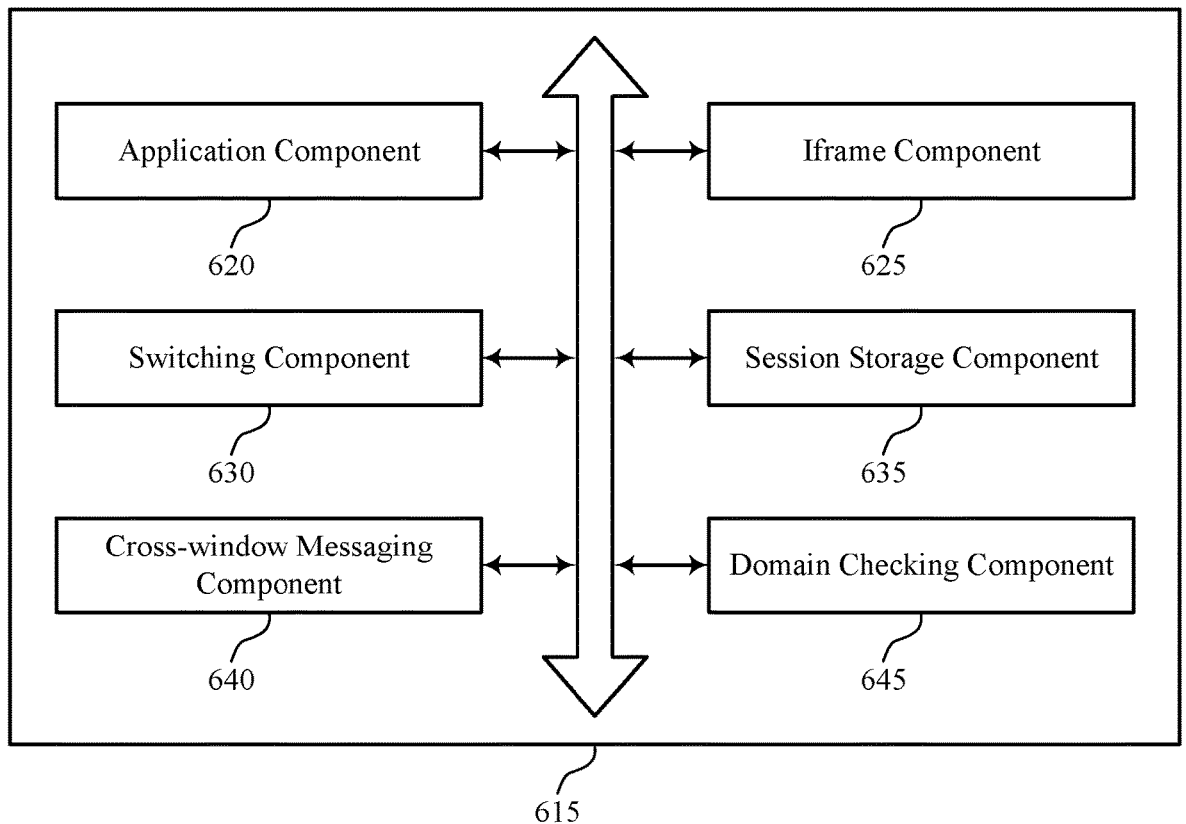

FIG. 6 shows a block diagram 600 of a cross-domain storage module 615 that supports secure cross-domain session storage in accordance with aspects of the present disclosure. The cross-domain storage module 615 may be an example of aspects of a cross-domain storage module 715 described with reference to FIGS. 5 and 7. The cross-domain storage module 615 may include application component 620, iframe component 625, switching component 630, session storage component 635, cross-window messaging component 640, and domain checking component 645. Each of these modules may communicate, directly or indirectly, with one another (e.g., via one or more buses).

Application component 620 may receive, at a host server, a request to load a cross-domain application on a first container webpage, the first container webpage corresponding to a first web domain.

Iframe component 625 may load, in the first container webpage, an inline frame enclosed document corresponding to the cross-domain application, where the inline frame enclosed document is hosted by the host server and associated with a host web domain different than the first web domain. Additionally, iframe component 625 may reload, in a second container webpage, the inline frame enclosed document based on the host web domain, where the inline frame enclosed document is hosted by the host server and associated with the host web domain. In some cases, the inline frame enclosed document includes a live web chat session.

Switching component 630 may receive an indication of a webpage switch to the second container webpage corresponding to a second web domain different than the first web domain and the host web domain.

Session storage component 635 may store session data associated with the inline frame enclosed document in session storage, where reloading the inline frame enclosed document is based on the stored session data. In some cases, the session data includes a key associated with document data of the inline frame enclosed document, a key associated with the cross-domain application, a key associated with a shared storage domain, an indication of the host web domain, or a combination thereof.

Cross-window messaging component 640 may receive, in script on the inline frame enclosed document, an indication of a user command message associated with session data, where the indication is received from the first container webpage using cross-window messaging. In some cases, the user command message includes a get data command, a set data command, a delete data command, or a combination thereof. In some cases, the cross-window messaging includes a postMessage function and an onMessage handler.

Domain checking component 645 may identify a shared storage web domain associated with the first web domain and determine that the second web domain is also associated with the shared storage web domain, where reloading the inline frame enclosed document is based on the determining. In some cases, the shared storage web domain includes a top-level web domain. In some cases, the first web domain, the second web domain, or a combination thereof include web sub-domains of the top-level web domain. In some cases, the shared storage web domain and the host web domain are different web domains.

Figure 7:
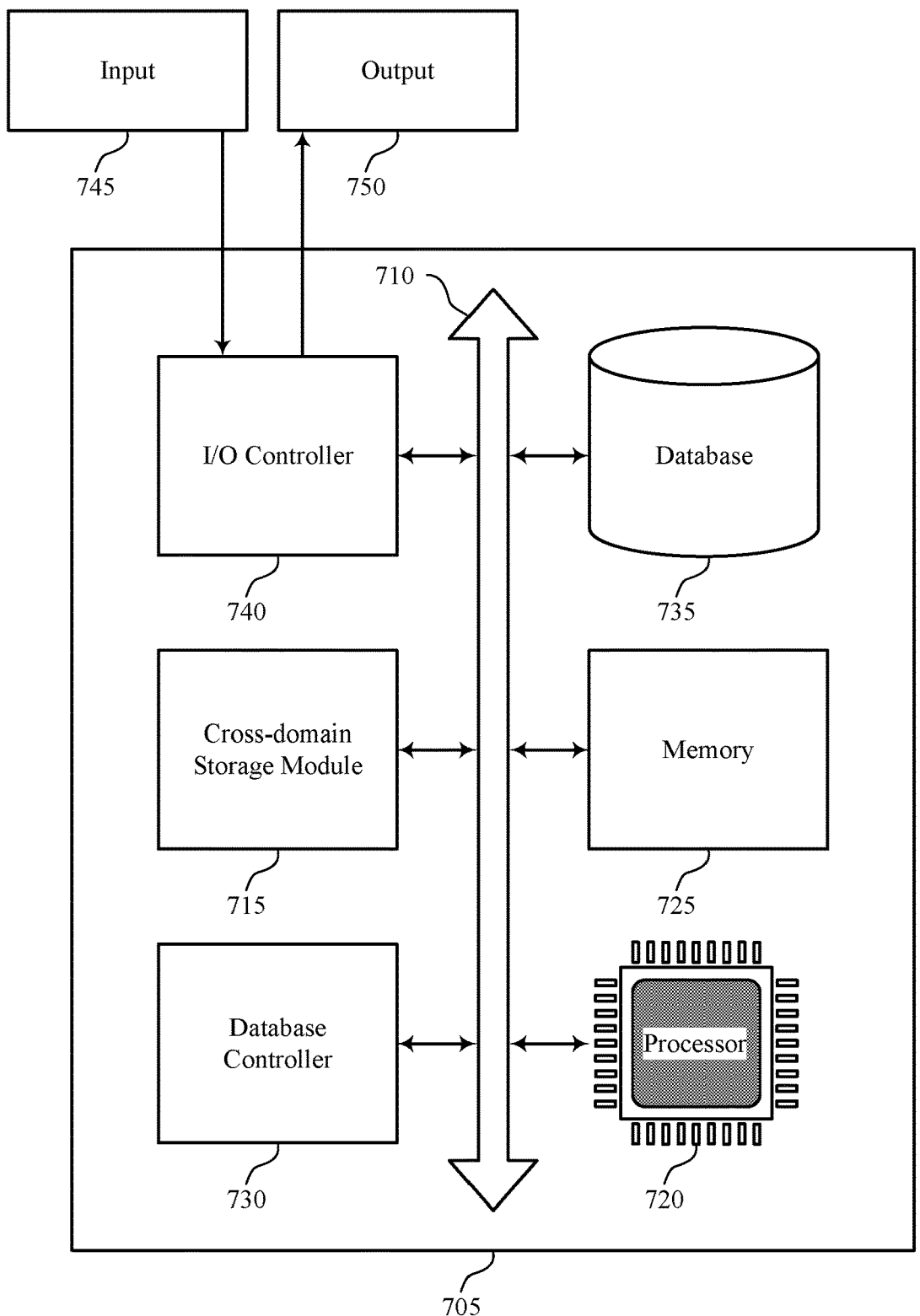
FIG. 7 illustrates a block diagram of a system including a host server that supports secure cross-domain session storage in accordance with aspects of the present disclosure.

FIG. 7 shows a diagram of a system 700 including a device 705 that supports secure cross-domain session storage in accordance with aspects of the present disclosure. Device 705 may be an example of or include the components of a host server, such as a host server 215 or a component of a data center 120, as described above, e.g., with reference to FIGS. 2 and 1. Device 705 may include components for bi-directional data communications including components for transmitting and receiving communications, including cross-domain storage module 715, processor 720, memory 725, database controller 730, database 735, and I/O controller 740. These components may be in electronic communication via one or more buses (e.g., bus 710).

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting secure cross-domain session storage).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Database controller 730 may manage data storage and processing in database 735. In some cases, a user may interact with database controller 730. In other cases, database controller 730 may operate automatically without user interaction. Database 735 may be an example of a single database, a distributed database, multiple distributed databases, or an emergency backup database.

I/O controller 740 may manage input and output signals for device 705. I/O controller 740 may also manage peripherals not integrated into device 705. In some cases, I/O controller 740 may represent a physical connection or port to an external peripheral. In some cases, I/O controller 740 may utilize an operating system such as iOS®, ANDROID®, MS-DOS®, MS-WINDOWS®, OS/2®, UNIX®, LINUX®, or another known operating system. In other cases, I/O controller 740 may represent or interact with a modem, a keyboard, a mouse, a touchscreen, or a similar device. In some cases, I/O controller 740 may be implemented as part of a processor. In some cases, a user may interact with device 705 via I/O controller 740 or via hardware components controlled by I/O controller 740.

Figure 8:
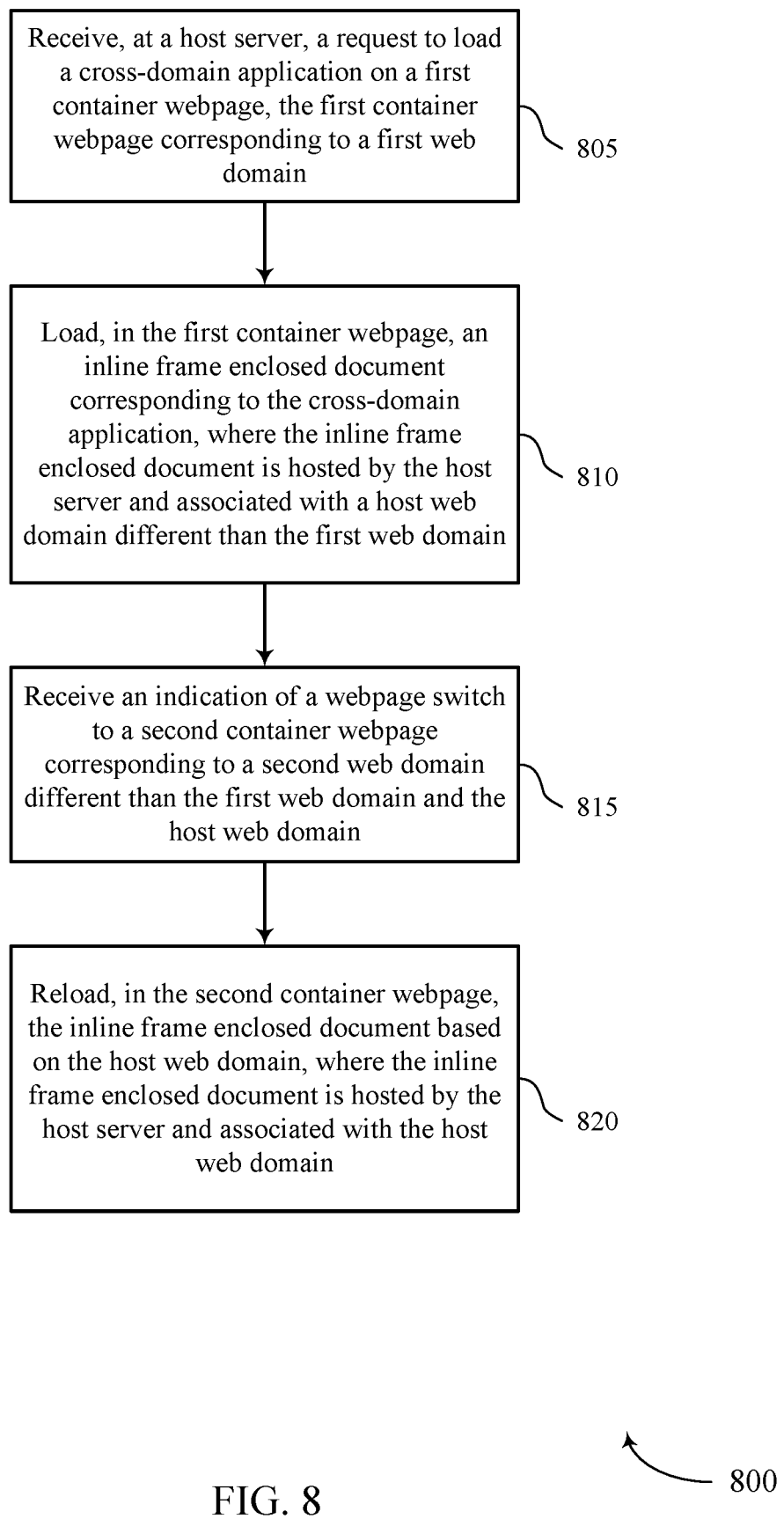
FIGS. 8 through 11 illustrate methods for secure cross-domain session storage in accordance with aspects of the present disclosure.

FIG. 8 shows a flowchart illustrating a method 800 for secure cross-domain session storage in accordance with aspects of the present disclosure. The operations of method 800 may be implemented by a host server, such as a host server 215, or its components as described herein. For example, the operations of method 800 may be performed by a cross-domain storage module as described with reference to FIGS. 5 through 7. In some examples, a host server (e.g., a host server 215) may execute a set of codes to control the functional elements of the device to perform the functions described below. Additionally or alternatively, the host server may perform aspects of the functions described below using special-purpose hardware.

At block 805 the host server may receive a request to load a cross-domain application on a first container webpage, the first container webpage corresponding to a first web domain. The operations of block 805 may be performed according to the methods described herein. In certain examples, aspects of the operations of block 805 may be performed by an application component as described with reference to FIGS. 5 through 7.

At block 810 the host server may load, in the first container webpage, an inline frame enclosed document corresponding to the cross-domain application, wherein the inline frame enclosed document is hosted by the host server and associated with a host web domain different than the first web domain. The operations of block 810 may be performed according to the methods described herein. In certain examples, aspects of the operations of block 810 may be performed by an iframe component as described with reference to FIGS. 5 through 7.

At block 815 the host server may receive an indication of a webpage switch to a second container webpage corresponding to a second web domain different than the first web domain and the host web domain. The operations of block 815 may be performed according to the methods described herein. In certain examples, aspects of the operations of block 815 may be performed by a switching component as described with reference to FIGS. 5 through 7.

At block 820 the host server may reload, in the second container webpage, the inline frame enclosed document based at least in part on the host web domain, wherein the inline frame enclosed document is hosted by the host server and associated with the host web domain. The operations of block 820 may be performed according to the methods described herein. In certain examples, aspects of the operations of block 820 may be performed by an iframe component as described with reference to FIGS. 5 through 7.

Figure 9:
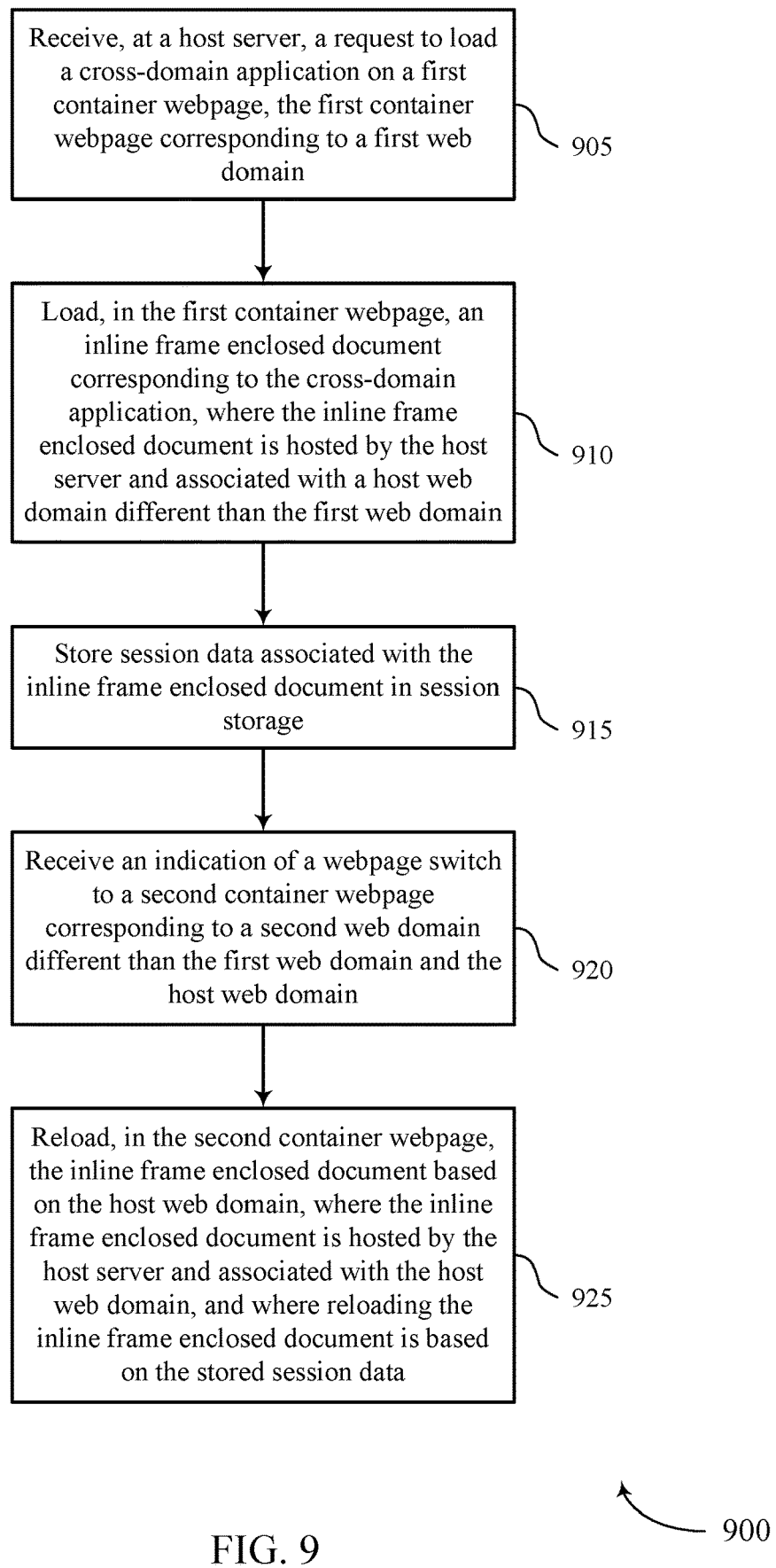

FIG. 9 shows a flowchart illustrating a method 900 for secure cross-domain session storage in accordance with aspects of the present disclosure. The operations of method 900 may be implemented by a host server, such as a host server 215, or its components as described herein. For example, the operations of method 900 may be performed by a cross-domain storage module as described with reference to FIGS. 5 through 7. In some examples, a host server (e.g., a host server 215) may execute a set of codes to control the functional elements of the device to perform the functions described below. Additionally or alternatively, the host server may perform aspects of the functions described below using special-purpose hardware.

At block 905 the host server may receive a request to load a cross-domain application on a first container webpage, the first container webpage corresponding to a first web domain. The operations of block 905 may be performed according to the methods described herein. In certain examples, aspects of the operations of block 905 may be performed by an application component as described with reference to FIGS. 5 through 7.

At block 910 the host server may load, in the first container webpage, an inline frame enclosed document corresponding to the cross-domain application, wherein the inline frame enclosed document is hosted by the host server and associated with a host web domain different than the first web domain. The operations of block 910 may be performed according to the methods described herein. In certain examples, aspects of the operations of block 910 may be performed by an iframe component as described with reference to FIGS. 5 through 7.

At block 915 the host server may store session data associated with the inline frame enclosed document in session storage. The operations of block 915 may be performed according to the methods described herein. In certain examples, aspects of the operations of block 915 may be performed by a session storage component as described with reference to FIGS. 5 through 7.

At block 920 the host server may receive an indication of a webpage switch to a second container webpage corresponding to a second web domain different than the first web domain and the host web domain. The operations of block 920 may be performed according to the methods described herein. In certain examples, aspects of the operations of block 920 may be performed by a switching component as described with reference to FIGS. 5 through 7.

At block 925 the host server may reload, in the second container webpage, the inline frame enclosed document based at least in part on the host web domain, wherein the inline frame enclosed document is hosted by the host server and associated with the host web domain. In some cases, reloading the inline frame enclosed document may be further based at least in part on the stored session data. The operations of block 925 may be performed according to the methods described herein. In certain examples, aspects of the operations of block 925 may be performed by an iframe component as described with reference to FIGS. 5 through 7.

Figure 10:
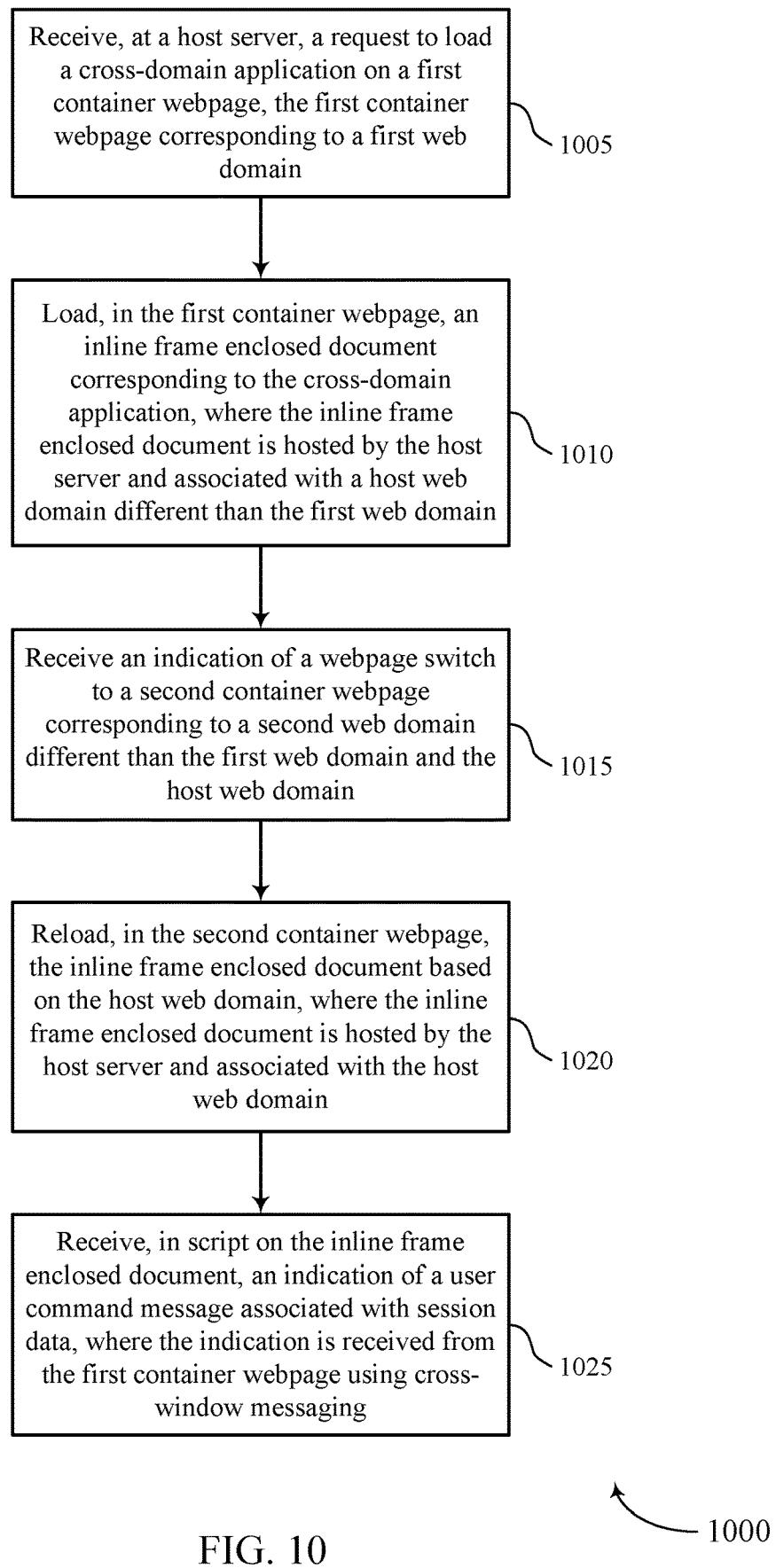

FIG. 10 shows a flowchart illustrating a method 1000 for secure cross-domain session storage in accordance with aspects of the present disclosure. The operations of method 1000 may be implemented by a host server, such as a host server 215, or its components as described herein. For example, the operations of method 1000 may be performed by a cross-domain storage module as described with reference to FIGS. 5 through 7. In some examples, a host server (e.g., a host server 215) may execute a set of codes to control the functional elements of the device to perform the functions described below. Additionally or alternatively, the host server may perform aspects of the functions described below using special-purpose hardware.

At block 1005 the host server may receive a request to load a cross-domain application on a first container webpage, the first container webpage corresponding to a first web domain. The operations of block 1005 may be performed according to the methods described herein. In certain examples, aspects of the operations of block 1005 may be performed by an application component as described with reference to FIGS. 5 through 7.

At block 1010 the host server may load, in the first container webpage, an inline frame enclosed document corresponding to the cross-domain application, wherein the inline frame enclosed document is hosted by the host server and associated with a host web domain different than the first web domain. The operations of block 1010 may be performed according to the methods described herein. In certain examples, aspects of the operations of block 1010 may be performed by an iframe component as described with reference to FIGS. 5 through 7.

At block 1015 the host server may receive an indication of a webpage switch to a second container webpage corresponding to a second web domain different than the first web domain and the host web domain. The operations of block 1015 may be performed according to the methods described herein. In certain examples, aspects of the operations of block 1015 may be performed by a switching component as described with reference to FIGS. 5 through 7.

At block 1020 the host server may reload, in the second container webpage, the inline frame enclosed document based at least in part on the host web domain, wherein the inline frame enclosed document is hosted by the host server and associated with the host web domain. The operations of block 1020 may be performed according to the methods described herein. In certain examples, aspects of the operations of block 1020 may be performed by an iframe component as described with reference to FIGS. 5 through 7.

At block 1025 the host server may receive, in script on the inline frame enclosed document, an indication of a user command message associated with session data, wherein the indication is received from the first container webpage using cross-window messaging. For example, the user command messaging may be an example of a get, set, or delete command, and the cross-window messaging may include both postMessage and onMessage functionality. The operations of block 1025 may be performed according to the methods described herein. In certain examples, aspects of the operations of block 1025 may be performed by a cross-window messaging component as described with reference to FIGS. 5 through 7.

Figure 11:
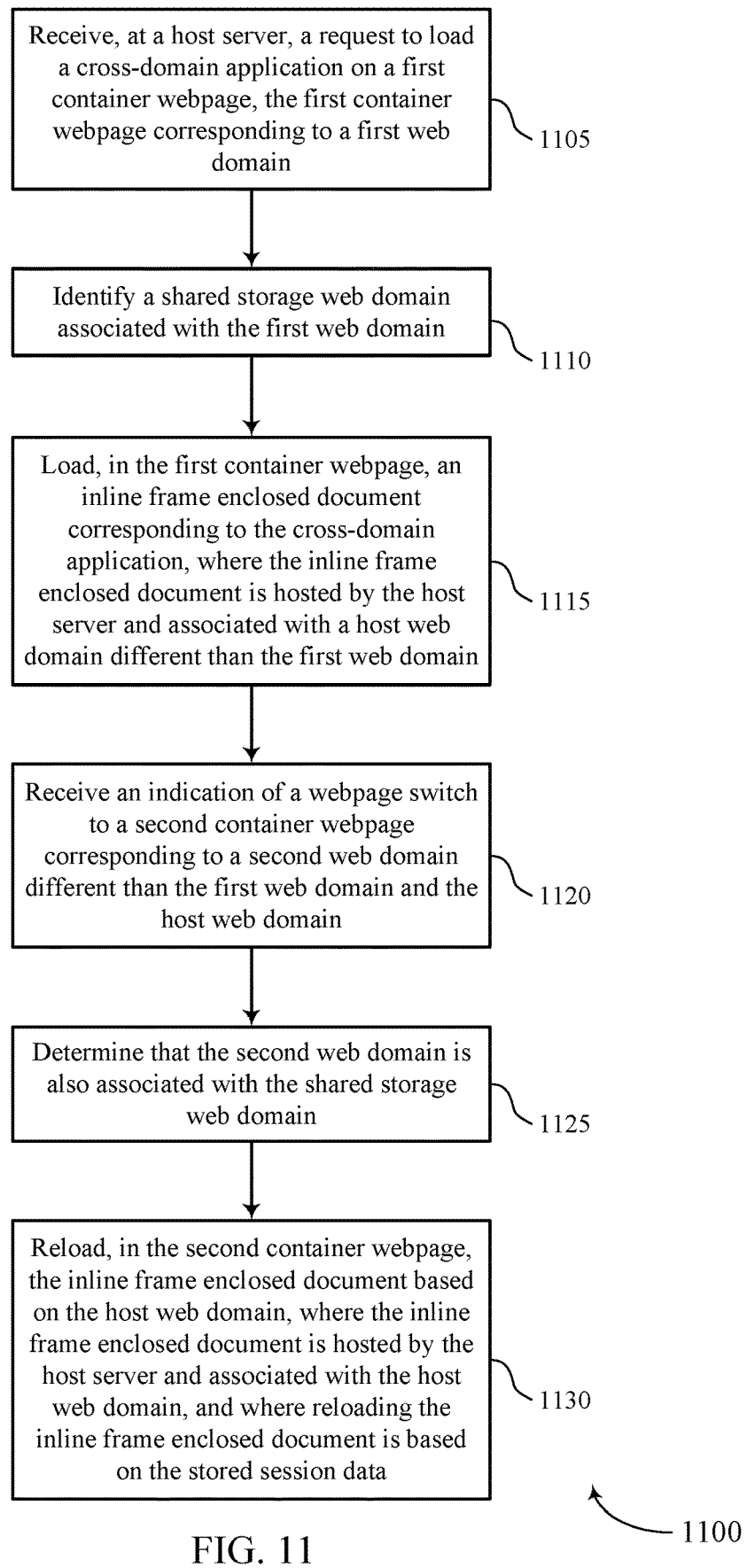

FIG. 11 shows a flowchart illustrating a method 1100 for secure cross-domain session storage in accordance with aspects of the present disclosure. The operations of method 1100 may be implemented by a host server, such as a host server 215, or its components as described herein. For example, the operations of method 1100 may be performed by a cross-domain storage module as described with reference to FIGS. 5 through 7. In some examples, a host server (e.g., a host server 215) may execute a set of codes to control the functional elements of the device to perform the functions described below. Additionally or alternatively, the host server may perform aspects of the functions described below using special-purpose hardware.

At block 1105 the host server may receive a request to load a cross-domain application on a first container webpage, the first container webpage corresponding to a first web domain. The operations of block 1105 may be performed according to the methods described herein. In certain examples, aspects of the operations of block 1105 may be performed by an application component as described with reference to FIGS. 5 through 7.

At block 1110 the host server may identify a shared storage web domain associated with the first web domain. The operations of block 1110 may be performed according to the methods described herein. In certain examples, aspects of the operations of block 1110 may be performed by a domain checking component as described with reference to FIGS. 5 through 7.

At block 1115 the host server may load, in the first container webpage, an inline frame enclosed document corresponding to the cross-domain application, wherein the inline frame enclosed document is hosted by the host server and associated with a host web domain different than the first web domain. The operations of block 1115 may be performed according to the methods described herein. In certain examples, aspects of the operations of block 1115 may be performed by an iframe component as described with reference to FIGS. 5 through 7.

At block 1120 the host server may receive an indication of a webpage switch to a second container webpage corresponding to a second web domain different than the first web domain and the host web domain. The operations of block 1120 may be performed according to the methods described herein. In certain examples, aspects of the operations of block 1120 may be performed by a switching component as described with reference to FIGS. 5 through 7.

At block 1125 the host server may determine that the second web domain is also associated with the shared storage web domain. The operations of block 1125 may be performed according to the methods described herein. In certain examples, aspects of the operations of block 1125 may be performed by a domain checking component as described with reference to FIGS. 5 through 7.

At block 1130 the host server may reload, in the second container webpage, the inline frame enclosed document based at least in part on the host web domain, wherein the inline frame enclosed document is hosted by the host server and associated with the host web domain. Additionally, reloading the inline frame enclosed document may be based at least in part on determining that the second web domain is associated with the shared storage web domain. The operations of block 1130 may be performed according to the methods described herein. In certain examples, aspects of the operations of block 1130 may be performed by an iframe component as described with reference to FIGS. 5 through 7.

A method of webpage domain handling is described. The method may include receiving, at a host server, a request to load a cross-domain application on a first container webpage, the first container webpage corresponding to a first web domain, and loading, in the first container webpage, an inline frame enclosed document corresponding to the cross-domain application, wherein the inline frame enclosed document is hosted by the host server and associated with a host web domain different than the first web domain. The method may further include receiving an indication of a webpage switch to a second container webpage corresponding to a second web domain different than the first web domain and the host web domain, and reloading, in the second container webpage, the inline frame enclosed document based at least in part on the host web domain, wherein the inline frame enclosed document is hosted by the host server and associated with the host web domain.

An apparatus for webpage domain handling is described. The apparatus may include a processor, memory in electronic communication with the processor, and instructions stored in the memory. The instructions may be operable to cause the processor to receive, at a host server, a request to load a cross-domain application on a first container webpage, the first container webpage corresponding to a first web domain, and load, in the first container webpage, an inline frame enclosed document corresponding to the cross-domain application, wherein the inline frame enclosed document is hosted by the host server and associated with a host web domain different than the first web domain. The instructions may be further operable to cause the processor to receive an indication of a webpage switch to a second container webpage corresponding to a second web domain different than the first web domain and the host web domain, and reload, in the second container webpage, the inline frame enclosed document based at least in part on the host web domain, wherein the inline frame enclosed document is hosted by the host server and associated with the host web domain.

A non-transitory computer readable medium for webpage domain handling is described. The non-transitory computer-readable medium may include instructions operable to cause a processor to receive, at a host server, a request to load a cross-domain application on a first container webpage, the first container webpage corresponding to a first web domain, and load, in the first container webpage, an inline frame enclosed document corresponding to the cross-domain application, wherein the inline frame enclosed document is hosted by the host server and associated with a host web domain different than the first web domain. The non-transitory computer-readable medium may include further instructions operable to cause a processor to receive an indication of a webpage switch to a second container webpage corresponding to a second web domain different than the first web domain and the host web domain, and reload, in the second container webpage, the inline frame enclosed document based at least in part on the host web domain, wherein the inline frame enclosed document is hosted by the host server and associated with the host web domain.

Some examples of the method, apparatus, and non-transitory computer-readable medium described above may further include processes, features, means, or instructions for storing session data associated with the inline frame enclosed document in session storage, wherein reloading the inline frame enclosed document may be based at least in part on the stored session data. In some examples of the method, apparatus, and non-transitory computer-readable medium described above, the session data comprises a key associated with document data of the inline frame enclosed document, a key associated with the cross-domain application, a key associated with a shared storage domain, an indication of the host web domain, or a combination thereof.

Some examples of the method, apparatus, and non-transitory computer-readable medium described above may further include processes, features, means, or instructions for receiving, in script on the inline frame enclosed document, an indication of a user command message associated with session data, wherein the indication may be received from the first container webpage using cross-window messaging. In some examples of the method, apparatus, and non-transitory computer-readable medium described above, the user command message comprises a get data command, a set data command, a delete data command, or a combination thereof. In some examples of the method, apparatus, and non-transitory computer-readable medium described above, the cross-window messaging comprises a postMessage function and an onMessage handler.

Some examples of the method, apparatus, and non-transitory computer-readable medium described above may further include processes, features, means, or instructions for identifying a shared storage web domain associated with the first web domain. Some examples of the method, apparatus, and non-transitory computer-readable medium described above may further include processes, features, means, or instructions for determining that the second web domain may be also associated with the shared storage web domain, wherein reloading the inline frame enclosed document may be based at least in part on the determining.

In some examples of the method, apparatus, and non-transitory computer-readable medium described above, the shared storage web domain comprises a top-level web domain. In some examples of the method, apparatus, and non-transitory computer-readable medium described above, the first web domain, the second web domain, or a combination thereof comprise web sub-domains of the top-level web domain. In some examples of the method, apparatus, and non-transitory computer-readable medium described above, the shared storage web domain and the host web domain may be different web domains.

In some examples of the method, apparatus, and non-transitory computer-readable medium described above, the inline frame enclosed document comprises a live web chat session.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for webpage domain handling, comprising:
receiving, at a host server, a request to load a cross-domain application on a first container webpage, the first container webpage corresponding to a first web domain;
loading, in the first container webpage, an inline frame enclosed document corresponding to the cross-domain application, wherein the inline frame enclosed document is hosted by the host server and associated with a host web domain;
receiving an indication of a webpage switch to a second container webpage corresponding to a second web domain different than the first web domain and the host web domain; and
reloading, in the second container webpage, the inline frame enclosed document based at least in part on the host web domain, wherein the inline frame enclosed document is hosted by the host server and associated with the host web domain, wherein the host web domain is different than the first web domain and the second web domain.

2. The method of claim 1, further comprising:
storing session data associated with the inline frame enclosed document in session storage, wherein reloading the inline frame enclosed document is based at least in part on the stored session data.

3. The method of claim 2, wherein the session data comprises a key associated with document data of the inline frame enclosed document, a key associated with the cross-domain application, a key associated with a shared storage domain, an indication of the host web domain, or a combination thereof.

4. The method of claim 1, further comprising:
receiving, in script on the inline frame enclosed document, an indication of a user command message associated with session data, wherein the indication is received from the first container webpage using cross-window messaging.

5. The method of claim 4, wherein the user command message comprises a get data command, a set data command, a delete data command, or a combination thereof.

6. The method of claim 4, wherein the cross-window messaging comprises a postMessage function and an onMessage handler.

7. The method of claim 1, further comprising:
identifying a shared storage web domain associated with the first web domain; and
determining that the second web domain is also associated with the shared storage web domain, wherein reloading the inline frame enclosed document is based at least in part on the determining.

8. The method of claim 7, wherein:
the shared storage web domain comprises a top-level web domain; and
the first web domain, the second web domain, or a combination thereof comprise web sub-domains of the top-level web domain.

9. The method of claim 7, wherein the shared storage web domain and the host web domain are different web domains.

10. The method of claim 1, wherein the inline frame enclosed document comprises a live web chat session.

11. An apparatus for webpage domain handling, comprising:
a processor;
memory in electronic communication with the processor; and
instructions stored in the memory and operable, when executed by the processor, to cause the apparatus to:
receive, at a host server, a request to load a cross-domain application on a first container webpage, the first container webpage corresponding to a first web domain;
load, in the first container webpage, an inline frame enclosed document corresponding to the cross-domain application, wherein the inline frame enclosed document is hosted by the host server and associated with a host web domain;
receive an indication of a webpage switch to a second container webpage corresponding to a second web domain different than the first web domain and the host web domain; and
reload, in the second container webpage, the inline frame enclosed document based at least in part on the host web domain, wherein the inline frame enclosed document is hosted by the host server and associated with the host web domain, wherein the host web domain is different than the first web domain and the second web domain.

12. The apparatus of claim 11, wherein the instructions are further executable by the processor to:
store session data associated with the inline frame enclosed document in session storage, wherein reloading the inline frame enclosed document is based at least in part on the stored session data.

13. The apparatus of claim 12, wherein the session data comprises a key associated with document data of the inline frame enclosed document, a key associated with the cross-domain application, a key associated with a shared storage domain, an indication of the host web domain, or a combination thereof.

14. The apparatus of claim 11, wherein the instructions are further executable by the processor to:
receive, in script on the inline frame enclosed document, an indication of a user command message associated with session data, wherein the indication is received from the first container webpage using cross-window messaging.

15. The apparatus of claim 11, wherein the instructions are further executable by the processor to:
identify a shared storage web domain associated with the first web domain; and
determine that the second web domain is also associated with the shared storage web domain, wherein reloading the inline frame enclosed document is based at least in part on the determining.

16. A non-transitory computer readable medium storing code for webpage domain handling, the code comprising instructions executable by a processor to:
receive, at a host server, a request to load a cross-domain application on a first container webpage, the first container webpage corresponding to a first web domain;
load, in the first container webpage, an inline frame enclosed document corresponding to the cross-domain application, wherein the inline frame enclosed document is hosted by the host server and associated with a host web domain;

receive an indication of a webpage switch to a second container webpage corresponding to a second web domain different than the first web domain and the host web domain; and reload, in the second container webpage, the inline frame enclosed document based at least in part on the host web domain, wherein the inline frame enclosed document is hosted by the host server and associated with the host web domain, wherein the host web domain is different than the first web domain and the second web domain.

17. The non-transitory computer-readable medium of claim 16, wherein the instructions are further executable by the processor to:

store session data associated with the inline frame enclosed document in session storage, wherein reloading the inline frame enclosed document is based at least in part on the stored session data.

18. The non-transitory computer-readable medium of claim 17, wherein the session data comprises a key associated with document data of the inline frame enclosed document, a key associated with the cross-domain application, a key associated with a shared storage domain, an indication of the host web domain, or a combination thereof.

19. The non-transitory computer-readable medium of claim 16, wherein the instructions are further executable by the processor to:

receive, in script on the inline frame enclosed document, an indication of a user command message associated with session data, wherein the indication is received from the first container webpage using cross-window messaging.

20. The non-transitory computer-readable medium of claim 16, wherein the instructions are further executable by the processor to:

identify a shared storage web domain associated with the first web domain; and determine that the second web domain is also associated with the shared storage web domain, wherein reloading the inline frame enclosed document is based at least in part on the determining.

* * * * *